(12) United States Patent
Makljenovic et al.

(10) Patent No.: US 9,411,662 B2
(45) Date of Patent: *Aug. 9, 2016

(54) CONTROLLING PRIORITY LEVELS OF PENDING THREADS AWAITING PROCESSING

(71) Applicant: ARM LIMITED, Cambridge (GB)

(72) Inventors: Nebojsa Makljenovic, Cambridge (GB); Edvard Fielding, Trondheim (NO); Andreas Due Engh-Halstvedt, Trondheim (NO)

(73) Assignee: ARM Limited, Cambridge (GB)

( * ) Notice: Subject to any disclaimer, the term of this patent is extended or adjusted under 35 U.S.C. 154(b) by 467 days.

This patent is subject to a terminal disclaimer.

(21) Appl. No.: 13/942,816

(22) Filed: Jul. 16, 2013

(65) Prior Publication Data

US 2013/0305255 A1 Nov. 14, 2013

Related U.S. Application Data

(63) Continuation of application No. 13/064,598, filed on Apr. 1, 2011, now Pat. No. 8,589,934.

(51) Int. Cl.
*G06F 9/46* (2006.01)
*G06F 9/54* (2006.01)
*G06F 9/50* (2006.01)
*G06F 9/38* (2006.01)

(52) U.S. Cl.
CPC ............ *G06F 9/54* (2013.01); *G06F 9/3851* (2013.01); *G06F 9/3859* (2013.01); *G06F 9/5011* (2013.01); *G06F 2209/507* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 5,900,025 A * | 5/1999 | Sollars | G06F 9/462 712/248 |
| 6,691,222 B2 | 2/2004 | Janik et al. | |
| 6,874,144 B1 * | 3/2005 | Kush | G06F 9/524 718/100 |
| 6,988,268 B2 | 1/2006 | Zuberi | |
| 7,082,519 B2 | 7/2006 | Kelsey et al. | |
| 7,140,022 B2 * | 11/2006 | Binns | G06F 9/4887 718/100 |
| 7,406,690 B2 * | 7/2008 | Jenkins | G06F 9/52 710/240 |
| 7,418,576 B1 | 8/2008 | Lindholm et al. | |
| 7,441,101 B1 | 10/2008 | Steiss et al. | |
| 7,752,621 B2 * | 7/2010 | Kush | G06F 9/524 718/100 |
| 7,752,627 B2 | 7/2010 | Jones et al. | |
| 7,802,057 B2 | 9/2010 | Iyer et al. | |
| 8,190,864 B1 | 5/2012 | Jordan et al. | |
| 8,255,912 B2 * | 8/2012 | Brackman | G06F 9/4806 710/260 |
| 8,756,605 B2 * | 6/2014 | Aingaran | G06F 9/3842 718/103 |

(Continued)

*Primary Examiner* — Van Nguyen
(74) *Attorney, Agent, or Firm* — Nixon & Vanderhye P.C.

(57) ABSTRACT

A data processing apparatus comprises processing circuitry arranged to process processing threads using resources accessible to the processing circuitry. A pipeline is provided for handling at least two pending threads awaiting processing by the processing circuitry. The pipeline includes at least one resource-requesting pipeline stage for requesting access to resources for the pending threads. A priority controller controls priority levels of the pending threads. The priority levels define a priority with which pending threads are granted access to resources. When a pending thread reaches a final pipeline stage, if the request resources are not yet available then the priority level of that thread is raised selectively and the thread is returned to a first pipeline stage of the pipeline. If the requested resources are available then the thread is forwarded from the pipeline.

23 Claims, 3 Drawing Sheets

(56) References Cited

U.S. PATENT DOCUMENTS

| | | | |
|---|---|---|---|
| 8,832,702 B2 * | 9/2014 | Bruce | G06F 9/485 718/103 |
| 2003/0037228 A1 | 2/2003 | Kelsey et al. | |
| 2003/0204552 A1 | 10/2003 | Zuberi | |
| 2007/0277177 A1 | 11/2007 | Kawamoto | |
| 2009/0172315 A1 | 7/2009 | Iyer et al. | |

* cited by examiner

CONTROLLING PRIORITY LEVELS OF PENDING THREADS AWAITING PROCESSING

This application is a Continuation of application Ser. No. 13/064,598, filed Apr. 1, 2011, now U.S. Pat. No. 8,589,934, the entire content of which is incorporated herein by reference.

The present invention relates to the field of data processing. More particularly, the invention relates to controlling priority levels of threads awaiting processing.

BACKGROUND

A processing circuit may perform processing operations in units called processing threads. Each processing thread represents a different task to be performed by the processing circuit. For example, a graphics processor may execute a number of processing threads, with each thread corresponding to a particular pixel or group of pixels of an image being processed by the graphics processor.

A processing thread may require certain resources to be available to the processing circuit before it can be executed. For example, the processing circuit may require access to data in a memory or cache, or may require bandwidth to be allocated on a particular piece of hardware, in order to execute the thread. Hence, to the processing circuit waits for the required resources to become available before the thread can be processed. When multiple threads are awaiting allocation of resources, then resources which become available may be allocated to any of the pending threads. The present technique seeks to provide an efficient technique for prioritizing the allocation of resources to pending threads.

SUMMARY

Viewed from one aspect, the present invention provides a data processing apparatus comprising:

processing circuitry configured to process processing threads using resources accessible to said processing circuitry;

a pipeline for handling at least two pending threads awaiting processing by said processing circuitry, said pipeline comprising at least one pipeline stage including at least one resource-requesting pipeline stage for requesting access to said resources for said pending threads;

a pipeline controller configured to determine whether requested resources are available for a pending thread in a final pipeline stage of said pipeline, to return said pending thread to a first pipeline stage of said pipeline if said requested resources are not yet available for said pending thread, and to forward said pending thread from said pipeline if said requested resources are available for said pending thread;

a priority controller for controlling priority levels of said pending threads, said priority levels defining a priority with which respective pending threads are granted access to resources, pending threads being assigned a base priority level when entering said pipeline for the first time;

wherein said priority controller is configured to selectively raise the current priority level of a pending thread in said final pipeline stage if said pipeline controller returns said pending thread to said first pipeline stage.

In a data processing apparatus, processing circuitry is provided to process processing threads using resources accessible to the processing circuitry. The resources may comprise anything required for execution of the processing threads, for example data, instructions, storage space in a storage unit, allocation of bandwidth, access to a hardware device and so on. A pipeline is provided for handling at least two pending threads awaiting processing by the processing circuitry. The pipeline comprises at least one pipeline stage. At least one of the stages of the pipeline is a resource-requesting pipeline stage for requesting access to resources for pending threads.

Following a request for resources, the requested resources may not be available immediately. When a pending thread reaches a final pipeline stage of the pipeline, a pipeline controller determines whether the resources requested for that thread are available. If the requested resources are available for the pending thread in the final stage of the pipeline, then the pending thread is forwarded from the pipeline (either directly to the processing circuitry ready for processing, or to another element of the apparatus before being processed by the processing circuitry).

On the other hand, if the requested resources are not yet available for the pending thread in the final stage of the pipeline, then the thread is returned to a first pipeline stage of the pipeline so that it will pass through the pipeline once more. Thus, threads for which resources have not yet become available can loop through the pipeline until the requested resources are available. The pipeline may therefore be considered to be a pipelined loop for queuing pending processing threads until resources become available.

Two or more pending threads may be in flight within the pipeline at a given instant. Hence, it is possible that multiple pending threads could be competing for access to the same resource. A priority controller is provided for controlling priority levels of the pending threads. The priority levels define a priority with which respective pending threads are granted access to resources. Thus, each thread within the pipeline may be assigned a priority level. A thread with a higher priority level may be granted access to a given resource in preference to a thread with a lower priority level that is awaiting access to the same kind of resource.

The priority controller is arranged to selectively raise the current priority level of a pending thread in the final pipeline stage if the pipeline controller returns the pending thread to the first pipeline stage because the resources required by that thread have not yet become available. Hence, the oldest pending thread, which has been looped back to the beginning of the pipeline the most times, will tend to have the highest priority level and so will be granted access to resources in preference to newer pending threads. This reduces the likelihood of an old pending thread getting stuck in the pipeline indefinitely, thus improving the throughput of the pending threads through the pipeline, and hence the processing efficiency.

The present technique also recognises that if a newer thread is awaiting access to a different resource to an older thread, then it is desirable for the newer thread to be able to proceed and be forwarded from the pipeline if the resource required by the newer thread is available before the resource required by the older thread. That is, newer threads whose resources are available should progress through the pipeline and be forwarded on to the processing circuitry while older threads are looping and waiting for resources. This scenario may be referred to as a "hit under miss" scenario. The present technique enables such a scenario to take place because the pipeline can handle at least two pending threads, and so even though an older thread in the pipeline will generally have the highest priority level, a newer thread having a lower priority can still progress and be processed ahead of the older thread if, when the newer thread reaches the final pipeline stage, its resources are available first. If an older thread remains in the pipeline for a long time while awaiting resources, then each time a newer thread exits the pipeline, another new thread can enter the pipeline and request resources. Hence, there is no bound on the number of threads which can progress through the pipeline in the hit under miss scenario.

For all these reasons, the present technique achieves an efficient throughput of pending threads, and so enables efficient processing of the threads by the processing circuitry.

In some embodiments, the pipeline may comprise a plurality of pipeline stages including the at least one resource-requesting pipeline stage. That is, not every pipeline stage of the pipeline need be a resource-requesting pipeline stage. There may be other stages which have functions other than requesting resources, for example a stage may perform instruction decoding functions.

In one embodiment, the pipeline controller and priority controller may be provided separately from the final pipeline stage of the pipeline. Thus, the final stage of the pipeline may have some processing function or may be a resource-requesting pipeline stage, a separate pipeline controller may control the looping or forwarding of the pending threads from the final stage, and a priority controller may control the priority level of the pending thread in the final stage.

Alternatively, the final pipeline stage of the pipeline may comprise at least one of the pipeline controller and the priority controller. Thus, the final pipeline stage may be considered as a stage for controlling the looping or forwarding of the pending threads within the pipeline and controlling priority levels. The final pipeline stage need not necessarily have another function beyond the function of the pipeline controller or priority controller.

The data processing apparatus may comprise an arbiter which is configured to select pending threads for input to the first pipeline stage of the pipeline. The arbiter may be configured to select pending threads that are returned from the final pipeline stage by the pipeline controller in preference to new pending threads that have not yet entered the pipeline. Thus, the arbiter allows a new thread to enter the pipeline in cycles when there is no looped pending thread which is awaiting input to the first pipeline stage. This ensures that once a pending thread has entered the pipeline, then it will remain in the pipeline until its resources become available, and increases the likelihood that an older thread will be granted access to resources in preference to newer threads. Once the thread has left the pipeline, then a new thread can enter.

The priority controller may be configured to re-evaluate the current priority level of the pending thread on the final pipeline stage of the pipeline if the pending thread is returned to the first pipeline stage because its resources are not yet available. When the pending thread is returned to the first pipeline stage, the pending thread has a re-evaluated priority level. The priority controller may control the re-evaluation of the priority level such that the re-evaluated priority level is higher than the current priority level if the current priority level is lower than a priority cap level, and the re-evaluated priority level is equal to the current priority level if the current priority level is equal to or higher than the priority cap level. This means that the priority level of the pending thread that is looped back to the beginning of the pipeline is increased if the priority level has not yet reached the priority cap level, and remains at the current priority level if the current priority level is already at, or above, the cap level.

The priority controller may also lower the priority cap level if the re-evaluated priority level equals the priority cap level. This is useful because this ensures that after a first pending thread has reached the priority cap level, subsequent pending threads cannot reach the same priority level as the first pending thread, because the other pending threads' priority levels are capped at a lower level. This enables the oldest pending thread (i.e. the pending thread which reached the priority cap level first) to be distinguished from newer threads. Again, this feature helps to ensure that an older thread is granted access to resources in preference to a newer thread which is competing for the same resources.

The priority controller may determine whether the re-evaluated priority level equals the priority cap level either before or after the priority level has actually been re-evaluated by the priority controller. That is, in one embodiment the priority controller may determine from the original priority level of the thread in the final pipeline stage whether, after re-evaluating the priority level, the re-evaluated priority level would equal the priority cap level. Alternatively, the priority controller may wait until the priority cap level has actually been re-evaluated and then determine whether the re-evaluated priority level equals the priority cap level.

The priority controller may also be arranged such that, if a pending thread with a current priority level greater than the priority cap level is forwarded from the pipeline because its requested resources have become available, then the priority controller sets the priority cap level to the current priority level of that pending thread. This allows a subsequent thread to reach the priority level of the thread which has exited the pipeline.

In summary, by controlling the priority level using the priority cap level as described above, the priority levels of pending threads within the pipeline can be controlled so that the oldest pending thread within the pipeline has the highest priority and the newest pending thread has the lowest priority. When the oldest pending thread exits the pipeline, then a newer thread can acquire the highest priority level.

The priority levels may be represented by a set of discrete values including a base value representing the base priority level and the least one further value representing at least one higher priority level. For example, each pending thread within the pipeline may be associated with a priority tag comprising a numerical value representing the priority level. In the present application, the terms "higher" and "lower" are used to indicate that a higher priority level takes precedence over a lower priority level. However, the priority values used to represent such higher and lower priority levels need not correspond to larger and smaller numerical values. That is, although in one embodiment the largest numerical value could represent the highest priority level (e.g. priority level 1 takes precedence over priority level 0), in another embodiment the smallest numerical value could represent the highest priority level (e.g. priority value 0 takes precedence over priority level 1). Hence, the base value is simply the value which represents the priority level having the lowest significance, irrespective of the numerical value used for the base value.

In one embodiment, the pipeline may be arranged to handle a maximum of N pending threads (where N is an integer). In this case, the set of discrete values representing the priority levels may comprise M-bit binary values, where M is the smallest integer greater than or equal to log2(N) (i.e. the logarithm to base 2 of N). Log2(N) bits, rounded up to the nearest integer M, is the smallest number of bits that can provide a unique priority level for each thread when the maximum number of threads in flight in the pipeline.

Alternatively, a fewer number of bits than log2(N) could be used for the priority values. This enables the area overhead of the data processing apparatus to be reduced, because by using fewer bits, smaller comparators, registers, or other hardware components may be used to process the priority values. If desired, the priority value could have as few bits as 1. While using fewer bits than log2(N) may result in a certain amount of "unfairness" in resource allocation (a newer thread may be granted access to resources before an older thread), the number of newer threads which can overtake an older thread will be limited to a give number dependent on M and N and this degree of unfairness may be acceptable for a particular application. Accordingly, by varying the number of bits of the priority values, the extent to which resources are fairly allocated can be balanced against the area resource required for implementing the circuit, as desired for a given application.

The pipeline comprises at least one resource-requesting pipeline stage. However, in some cases there may be a plurality of resource-requesting pipeline stages for requesting access to associated resources for the pending threads. For example, one pipeline stage could request access to one type of resource (for example data in a cache) while another pipeline stage may request access to a different type of resource (for example network bandwidth). When there are a plurality of resource-requesting pipeline stages, then the pipeline controller may be arranged to return the pending thread in the final pipeline stage to the first pipeline stage if any of the resources associated with the plurality of resource-requesting pipeline stages is not yet available. Thus, a pending thread continues looping through the pipeline until all its required resources are available.

The present technique may be useful in embodiments where the processing circuit comprises a graphics processor. Graphics processors typically execute a number of processing threads, for example corresponding to different pixels or pixel groups of an image, so the present technique can be used for controlling the allocation of resources to the different threads. In one example, the processing threads may comprise texture mapping threads for controlling the graphics processor to perform texture mapping operations. Thus, for each thread the graphics processor may obtain texture data and apply the texture to a given pixel region within an image. The resources required by the texture mapping threads may include for example the data defining the texture to be applied, a texture mapping instruction for implementing the texture mapping operation, and a texturing descriptor defining further properties of the texture mapping operation.

The resources requested by the resource-requesting stage may include a wide variety of kinds of resources. For example, the resources may include at least one of:
 data or instructions from a storage unit;
 an allocation of space within the storage unit;
 bandwidth on a network, interconnect or bus; and
 use of a processing unit.

In one example, the resources include data or instructions from a cache memory. In this case, at least one of the resource-requesting pipeline stages may comprise a cache requesting stage which is configured to issue, to the cache memory, cache access requests for data or instructions on behalf of a pending thread within the cache requesting stage. Following such a request, if the data or instructions required are already located within the cache, then a cache hit occurs and so the required resource may be available relatively quickly. This situation may be expected to occur reasonably often, since many threads may use the same data value or the same instruction, and so once one thread's resources are available in the cache, the same resources may then be used by a number of other threads. On the other hand, if the requested data or instructions are not already within the cache, then a cache miss occurs and the data or instructions may be fetched from memory. In this case, the pending thread may need to wait for such data or instructions to become available in the cache.

If a cache access request for a pending thread in the cache requesting stage results in a cache miss, then the cache requesting stage may determine whether the cache memory includes an available storage location (e.g. a storage location not already storing a valid data value or instruction). If the cache memory includes an available storage location, then the cache requesting stage may allocate the available cache storage location to the pending thread and trigger a memory access request for the data or instructions requested by the cache access request. Thus, when the data or instructions are retrieved from memory then the data or instructions can be stored in the newly allocated cache storage location, so that the requested data or instructions are now available to the pending thread.

On some occasions the cache memory may not include an available storage location. For example, all the storage locations of the cache may already be storing data or an instruction on behalf of other threads. In this case, the cache requesting stage may determine whether an unavailable cache storage location of the cache memory is allocated to another pending thread having a lower priority than the pending thread in the cache requesting stage. If the other pending thread to which the unavailable cache storage location is allocated has the same priority or a higher priority than the current pending thread in the cache requesting stage, than the unavailable cache storage location cannot be allocated to the pending thread in the cache requesting stage. However, if the unavailable cache storage location is allocated to another pending thread having a lower priority then the pending thread in the cache requesting stage, then the unavailable cache storage location can be re-allocated to the current pending thread. Hence, the data or instruction already stored in the unavailable cache storage location for the lower priority thread may be evicted and a memory access request for the data or instructions requested for the thread currently in the cache requesting stage may be triggered. Therefore, the priority level associated with pending threads controls whether one thread can trigger an eviction of data associated with another thread. Since the older threads in the pipeline generally have the highest priority then this mechanism ensures that the older threads will tend to gain access to cached data in preference to a newer thread.

The eviction mechanism means that after allocating cache storage location to one thread, a later thread may then evict the data or instructions stored by the earlier thread and take over that cache storage location. Hence, even after resources have been placed in the cache so that the resources are available to a given thread, at a later time the resources may no longer be available for the thread. This is not a problem while pending threads continue to be looped through the pipeline, since the pending thread can be returned to the beginning of the pipeline and pass through the cache requesting stage again to request access to the cached data once more. However, once a thread exits the pipeline because its resources are available, a later thread should not evict the data allocated to the forwarded thread. To prevent resources allocated to forwarded threads being evicted, the apparatus may be arranged to comprise circuitry (e.g. a cache controller or part of the cache requesting stage) which controls the cache memory, when a pending thread for which the cache requesting stage has allocated a cache storage location is forwarded from the pipeline, to prevent re-allocation of the cache storage location allocated to that pending thread until processing of the pending thread is complete. Hence, the cache storage location allocated to a thread can be locked when the thread is forwarded from the pipeline to ensure that the allocated resource will still be available when the thread is processed by the processing circuitry.

Viewed from another aspect, the present invention provides a data processing apparatus comprising:

processing means for processing threads using resources accessible to said processing means;

pipeline means for handling at least two pending threads awaiting processing by said processing means, said pipeline means comprising at least one pipeline stage means including at least one resource-requesting pipeline stage means for requesting access to said resources for said pending threads;

pipeline control means for determining whether requested resources are available for a pending thread in a final pipeline stage means of said pipeline means, for returning said pending thread to a first pipeline stage means of said pipeline means if said requested resources are not yet available for said pending thread, and for forwarding said pending thread from said pipeline means if said requested resources are available for said pending thread;

priority control means for controlling priority levels of said pending threads, said priority levels defining a priority with which respective pending threads are granted access to resources, pending threads being assigned a base priority level when entering said pipeline means for the first time;

wherein said priority control means is arranged to selectively raise the current priority level of a pending thread in said final pipeline stage means if said pipeline control means returns said pending thread to said first pipeline stage means.

Viewed from a further aspect, the present invention provides data processing method for an apparatus comprising processing circuitry for processing threads using resources accessible to said processing circuitry and a pipeline for handling at least two pending threads awaiting processing by said processing circuitry, said pipeline comprising at least one pipeline stage including at least one resource-requesting pipeline stage for requesting access to resources for said pending threads, wherein said pending threads are associated with priority levels defining a priority with which respective pending threads are granted access to resources, pending threads being assigned a base priority level when entering said pipeline means for the first time; the method comprising the steps of:

(a) determining whether requested resources are available for a pending thread in a final pipeline stage of said pipeline;

(b) if said requested resources are not yet available for said pending thread in said final pipeline stage, returning said pending thread to a first pipeline stage of said pipeline and selectively raising the current priority level of said pending thread; and (c) if said requested resources are available for said pending thread in said final pipeline stage, forwarding said pending thread from said pipeline.

The above, and other objects, features and advantages of the invention will be apparent from the following detailed description of illustrative embodiments which is to be read in connection with the accompanying drawings.

BRIEF DESCRIPTION OF THE DRAWINGS

FIG. 3 illustrates an example of controlling the priority levels of pending threads using a 2-bit priority tag value; and FIG. 4 illustrates an example of controlling the priority level of pending threads using a 1-bit priority tag value.

DESCRIPTION OF EXAMPLE EMBODIMENTS

Figure 1:
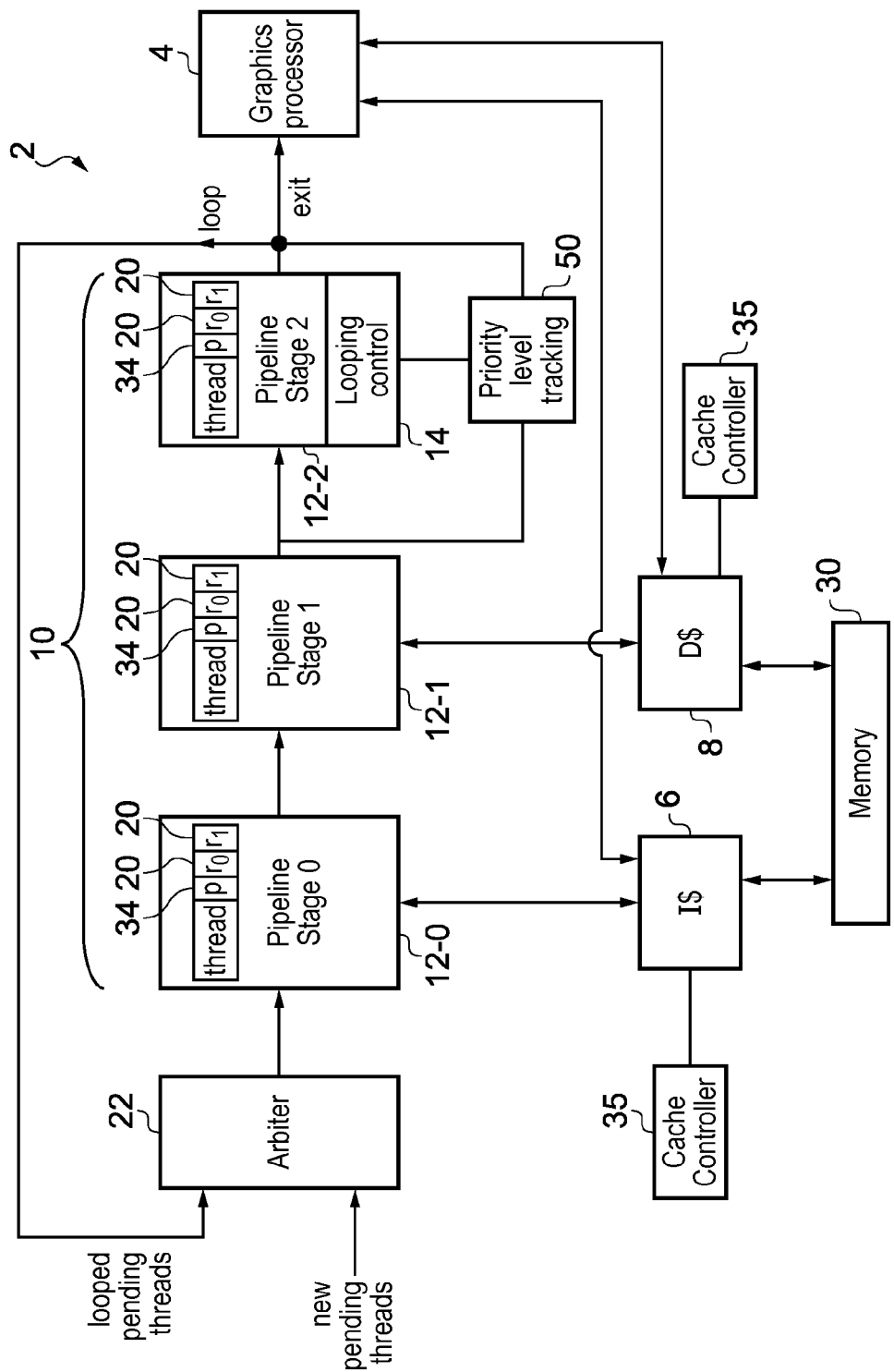
FIG. 1 schematically illustrates an apparatus comprising a processor for processing threads using resources accessible to the processor, and a pipeline for handling pending threads awaiting processing by the processing circuitry.

FIG. 1 schematically illustrates a data processing apparatus 2 comprising a processing circuit 4 for processing data. In this example, the processing circuit 4 is a graphics processor, but the processing circuit 4 may instead comprise any other type of circuit for performing processing operations. The processing circuit 4 processes processing threads using resources that are accessible to the processing circuit 4, such as instructions in an instruction cache 6 and data in a data cache 8. Each processing thread may comprise a particular task or processing operation to be performed by the processing circuit 4. For example, the graphics processor 4 may process texture mapping threads, each corresponding to a given pixel or group of pixels of an image to be rendered. The texture mapping threads may for example use texture mapping instructions stored in the instruction cache 6 and texture descriptors stored in the data cache 8. The texture descriptors define properties of the texture to be applied to pixels of a graphics image, texturing modes, formats of the texturing to be applied, and other parameters of the texturing operation.

While FIG. 1 illustrates pipeline stages that control requests for access to instructions or data in a cache, other pipeline stages may be provided to request access to other kinds of resources, such as an allocation of a region of storage space in a storage unit such as a memory, buffer or cache, the use of a processing unit (for example the allocation of a time slot during which the processing unit can perform processing on behalf of the thread), or the allocation of bandwidth on a network, interconnect or bus, for example.

A pipeline 10 is provided for handling pending processing threads which are awaiting processing by the graphics processor 4. Pending threads remain in the pipeline 10 until the resources required for executing the threads become available. The pipeline 10 includes at least one pipeline stage 12. At least two pending threads may be in flight in the pipeline at once. In the example of FIG. 1, there are three pipeline stages 12-0, 12-1, 12-2, which may each handle one pending thread, and so three threads may be in flight in the pipeline at a time. However, in other embodiments, different numbers of pipeline stages may be provided. Moreover, it is possible for each pipeline stage to handle more than one thread at a time (so that the pipeline acts as two or more pipelines arranged in parallel with one another).

Each pending thread may be associated with various parameters defining properties of that thread. In the example of FIG. 1, the threads are assigned a thread ID (thread) identifying the thread, a priority tag (p), and one or more resource availability flags (r). The priority tag p and resource availability flags r will be described below. Other kinds of information may also be provided for each thread.

At least one of the pipeline stages is a resource-requesting stage for requesting access to resources on behalf of a pending thread within that pipeline stage. In the example FIG. 1, the pipeline stage 12-0 is a resource-requesting stage for requesting access to instructions in the instruction cache 6 on behalf of a pending thread within the stage 12-0. Also, pipeline stage 12-1 is a resource-requesting stage for requesting access to descriptors in the data cache 8 on behalf of pending threads within the pipeline stage 12-1. It is not necessary for every pipeline stage 12 to make such requests for access to resources. Some pipeline stages may perform other tasks such as partially or fully decoding instructions, checking whether conditions required for processing a pending thread are satisfied, and other functions.

When a pipeline stage 12 requests resources on behalf of a pending thread, the resources may already be available, in which case the pending thread may be ready for processing reasonably quickly. Alternatively, the resources may not be available right away and the pending thread may need to wait until those resources become available before it can be processed. The pipeline comprises a looping control circuit 14 which checks whether a pending thread in the final stage 12-2 of the pipeline 10 is ready for processing by the processor 4. While in FIG. 1 the looping control circuit 14 is illustrated as part of the final pipeline stage 12-2, the looping control circuit 14 may also be provided separately from the final pipeline stage 12-2.

Each pending thread may be associated with one or more resource availability flags 20 for indicating whether a corresponding requested resource is available to that thread. For example, the flags may comprise a 1-bit value with one value of the flag (e.g. 1) representing an available resource and another value of the flag (e.g. 0) representing a resource that is not yet available. The resource-requesting pipeline stages 12-0, 12-1 set the corresponding resource availability flag 20 when a resource becomes available. For example, the pipeline stage 12-0 sets the resource availability flag $r_0$ if a request for an instruction in the instruction cache 6 results in a cache hit. If the request results in a cache miss, then the resource availability flag $r_0$ is cleared. Similarly, the pipeline stage 12-1 sets the corresponding resource availability flag $r_1$ to indicate whether a request for a descriptor in the data cache 8 has resulted in a cache hit or a cache miss. In a similar way, other resource availability flags may be provided to indicate whether other kinds of resources are available for a pending thread.

When a thread reaches the final stage 12-2 of the pipeline, then the looping control circuit 14 checks whether any of the resource availability flags 20 for that thread indicate that a requested resource is not yet available. If any of the resource availability flags 20 indicate that a requested resource is not yet available, then the thread is returned to the beginning of the pipeline to loop through the pipeline once more. In contrast, if all of the resource availability flags 20 indicate that the corresponding resource is available then the thread can be forwarded from the pipeline, ready for processing by the graphics processor 4.

When a thread is returned to the beginning of a pipeline by the looping control circuit 14, then the thread is passed to an arbiter 22 which selects pending threads to be input to the first pipeline stage 12-0 of the pipeline 10. The arbiter 22 selects between new pending threads which have not previously entered the pipeline 10 and looped pending threads which have been returned from the final pipeline stage 12-2 by the looping control circuit 14. The arbiter 22 may be arranged to preferentially select the looped pending threads ahead of the new pending threads, so that new pending threads may only be input to the first pipeline stage 12-0 in cycles where there are no looped pending threads awaiting input to the first pipeline stage 12-0.

When a pipeline stage 12 requests access to a resource, that resource may not be available right away. For example a cache access request from the cache requesting stage 12-0, 12-1 may result in a cache miss, and the instruction or data requested may need to be fetched from a memory 30. The fetched instruction or data does not become available for a pending thread until it has been allocated to a storage location within the cache 6, 8. If there is an available (empty or invalid) cache storage location within the cache 6, 8 then the fetched instruction or data can be stored in the available storage location.

However, if all of the storage locations of the cache 6, 8 are already occupied then the cache requesting stage 12-0, 12-1 determines whether an instruction or data can be evicted from the cache to accommodate the fetched instruction or data. Each thread is associated with a priority tag 34 defining a priority level which controls whether or not that thread may cause data allocated to other threads to be evicted from the cache 6, 8.

If there is a cache storage location which has been allocated to a thread with a lower priority than the thread currently within the cache requesting stage 12-0, 12-1, then data or instructions within the previously allocated storage location can be evicted and, if necessary written back to memory 30. The storage location is re-allocated to the higher priority thread currently in the cache requesting stage 12-0, 12-1, and a memory access request for the required instruction or data is then triggered to memory 30.

If there are no cache storage locations allocated to a thread with a lower priority than the current pending thread in the cache requesting stage 12-0, 12-1, then no data/instructions are evicted and the current pending thread instead waits until a cache storage location becomes available.

When a thread leaves the pipeline 10, then any cache storage locations allocated to that thread are locked to prevent the storage locations being re-allocated to other threads until the thread has been processed. The locking control may be performed by a circuit such as a cache controller 35, the cache 6, 8 itself or the resource-requesting stage 12-0, 12-1. After the thread has been processed, the storage locations allocated to that thread are unlocked so that they are available for other threads.

As well as controlling whether one thread may evict data of another thread, the priority levels specified by the priority tag 34 may be used in other ways to control the precedence with which respective threads are granted access to resources. For example, when multiple threads are awaiting access to a same kind of resource, then when a resource of that type becomes available, then the resource may be allocated to a higher priority thread in preference to a lower priority thread.

A priority controller 50 (or priority level tracker) is provided to control the priority levels of the pending threads within the pipeline 10. The priority controller 50 manages the priority levels in order to meet the following performance requirements. Firstly, it is desirable that older threads do not get stuck in the pipeline 10 indefinitely, and so if multiple threads are fighting for a resource, then preferably older threads should get the resource first. Therefore, generally an older thread should receive a higher priority level than a newer thread.

Also, while an older thread is waiting for resources and looping back through the pipeline 10, it is desirable that a newer thread whose resources are already available may progress through the pipeline and be forwarded from the pipeline. This scenario is called "hit under miss". To improve performance, the priority scheme is such that there is no upper bound on the number of newer threads that can progress through the loop in a hit under miss scenario.

To achieve these objectives, the priority controller 50 implements the following priority scheme. The priority tag 34 associated with each thread has a given number of bits. For example, if a 2-bit tag is used then the priority level for each thread can be set to any value between 0 and 3. In the examples explained subsequently, priority level 0 will be considered to represent the lowest priority level and priority level 3 will be considered to represent the highest priority level (such that a thread with priority level 3 takes precedence over a thread with priority level 0). However, it will be appreciated that in other schemes priority level 0 could represent the highest priority level and priority level 3 could represent the lowest priority level.

The priority controller 50 maintains a current priority level cap (CPLC) which caps the priority level of pending threads at a given level. The cap can be modified by the priority controller 50. Initially, the priority level cap is set at the highest priority level (i.e. priority level 3 in the 2-bit example).

When a new pending thread is input into the pipeline 10 for the first time by the arbiter 22, then the new pending thread is assigned a base priority level, which in the example described below is the lowest priority level 0.

When a thread reaches the final pipeline stage 12-2 of the pipeline 10, then the priority controller 50 re-evaluates the priority level of the pending thread in the final pipeline stage 12-2 in dependence on whether the thread is ready to leave the pipeline 10 or is to be returned to the start of the pipeline by the looping control circuit 14. If the pending thread is returned to the beginning of the pipeline by the looping control circuit 14, then the priority controller 50 determines whether or not the thread's current priority level is lower than the current value of the priority cap.

If the priority of the thread in the final stage 12-2 is lower than the current priority cap, then the priority level of that thread is incremented. Hence, when the thread re-enters the initial stage 12-0 if the pipeline 10 then it will have a higher priority level then in the previous iteration through the pipeline. This mechanism means that the threads which have been looped back the most times (i.e. the oldest threads) have the highest priority level. On the other hand, if the priority level of the thread in the final stage 12-2 of the pipeline is equal to, or greater than, the current value of the priority cap, then the priority level of that thread remains the same, because the priority level cannot be incremented beyond the priority cap level.

The priority cap may be modified by the priority controller when a thread is looped back from the final stage or forwarded from the pipeline by the looping control circuit 14. The priority cap is initially set to the highest priority level (priority level 3).

The priority cap is decremented by the priority controller 50 when a thread that reaches the priority cap level is looped back to the beginning of the pipeline 10. By decrementing the priority cap when one thread reaches the capped priority level, other threads are prevented from reaching the same priority level, and so this enables a unique priority level to be assigned to each thread in flight in the pipeline, and helps to ensure that the oldest thread will have the highest priority level. Nevertheless, there is no limit in how many threads can enter and exit the pipeline with the lowest priority level while a higher priority thread is looping, and so the number of threads which can progress in the pipeline in hit under miss scenario is unbounded.

When a thread is forwarded from the pipeline, then the priority cap is set to that thread's priority level if the priority level is higher than the current value of the cap. This means that another thread can now adopt the priority level of the thread which has exited the pipeline.

In the example of FIG. 1, the arbiter 22 and priority controller 50 are illustrated as being separate from the pipeline stages 12 of the pipeline 10. However, in other embodiments, it is possible to provide the arbiter 22 or priority controller 50 as part of a pipeline stage 12. For example, a pipeline may comprise three stages: an arbiter stage for selecting which threads enter the pipeline, a resource requesting stage for requesting resources on behalf of a pending thread, and a looping/priority control stage which provides the functions of the looping control circuit 14 and the priority controller 50. Hence, the manner in which the pipeline is divided into stages may vary from embodiment to embodiment.

An example algorithm for controlling the priority level of the pending thread in the final pipeline stage 12-2 and for setting the priority cap level is as follows:

---

Setting the thread priority level:
   If thread is not ready to exit the pipeline, then:
      If (thread_priority of the thread in the last stage < priority cap), then:
      reevaluated_thread_priority = thread_priority + 1
      else reevaluated_thread_priority = thread_priority.
Adjusting the priority cap level:
   If thread is not ready to exit the pipeline, then:
      If (reevaluated_thread_priority == priority cap) then:
         priority cap = priority cap − 1
   If thread is ready to exit the pipeline, then:
      If (thread_priority > priority cap), then:
         priority cap = thread_priority.

---

It will be appreciated that other algorithms may also be used.

Figure 2:
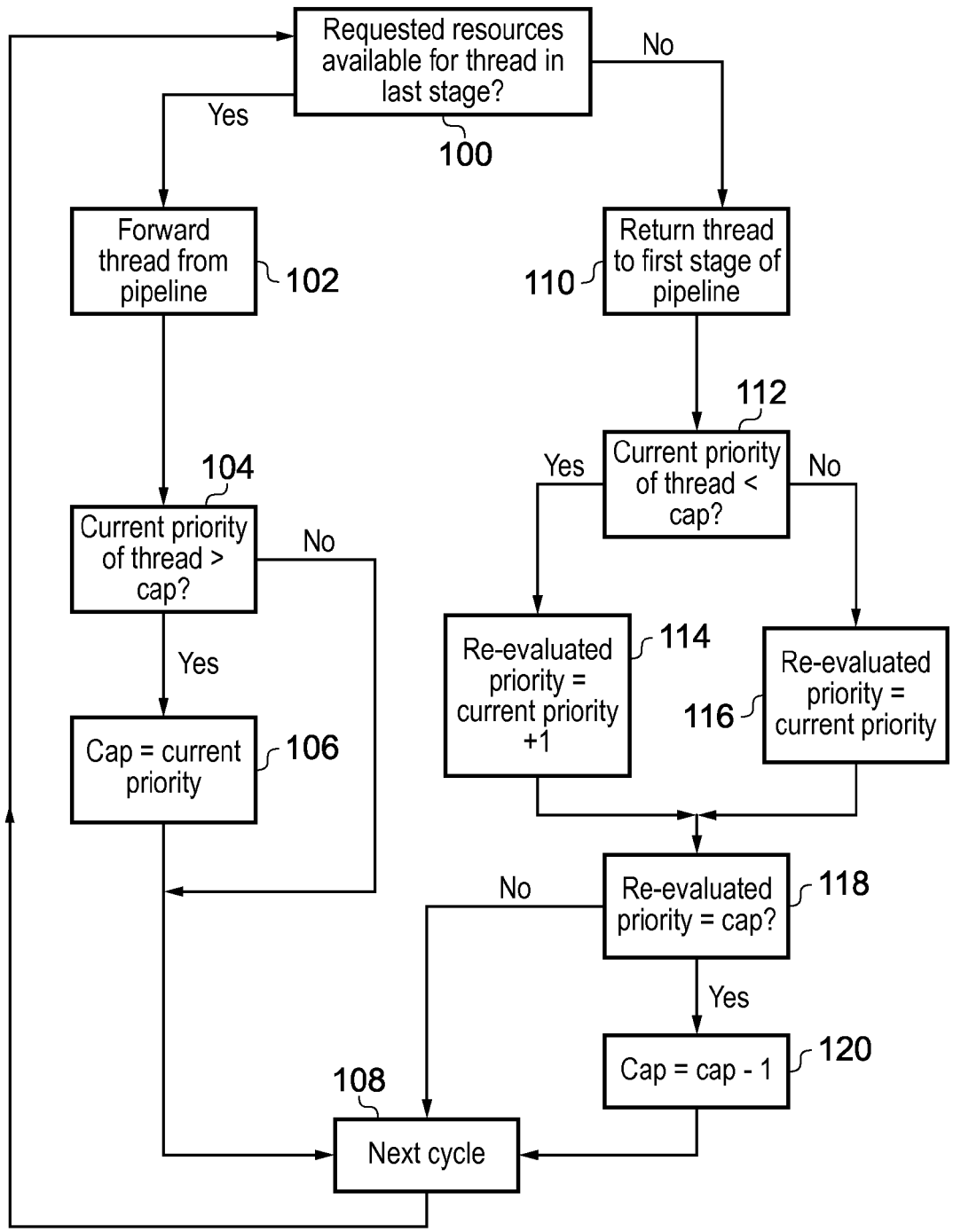
FIG. 2 illustrates a method of controlling the priority level of pending threads within the pipeline.

FIG. 2 illustrates a flow diagram representing the priority control algorithm. At step 100, the looping control circuit 14 determines whether the resources requested for the pending thread within the final pipeline stage 12-2 have become available. For example, the looping control circuit 14 may check the current values of the resource availability flags 20 to see whether all the requested resources are available.

If all the resources are available, then the method proceeds to step 102 where the thread is forwarded from the pipeline ready for processing by processing circuitry 4. Then, at step 104, the priority controller 50 determines whether or not the current priority level of the threads forwarded from the pipeline is greater than the current value of the priority cap. If the current priority level of the forwarded thread is greater than the current value of the priority cap, then at step 106 the priority cap is set equal to the current priority of that thread. On the other hand, if the current priority level of the thread is not greater than the current value of the priority cap then step 106 is omitted and the priority cap retains its previous value. At step 108 the pipeline 10 proceeds to the next processing cycle, so that threads within the pipeline move up one pipeline stage. Since a thread has exited the pipeline, a new thread can be input to the first stage 12-0 of the pipeline by the arbiter 22. The method then returns to step 100.

If at step 100 the looping control circuit 14 determines that at least one of the resources requested for the pending thread in the last stage 12-2 of the pipeline is not available, then the method proceeds to step 110, where the looping control circuit 14 returns the pending thread to the first stage of the pipeline. At step 112 the priority controller determines whether or not the current priority level of that thread is lower than the current value of the priority cap. If the current priority level of the pending thread that is looped back is lower than the current value of the priority cap, then at step 114 the priority level of that thread is incremented to give a re-evaluated priority level which is higher than the currently priority level. On the other hand, if at step 112 it is determined that the current priority value of the thread is greater than or equal to the priority cap, then at step 116 the thread retains its previous priority value. At step 118 the priority controller 50 determines whether or not the re-evaluated priority level of the thread is equal to the priority cap. If the re-evaluated priority level is equal to the priority cap, then at step 120 the priority cap is decremented. This ensures that no other pending thread can reach the same priority level as the pending thread which has reached the priority cap level. Alternatively, if at step 118 the re-evaluated priority level is not equal to the priority cap, then step 120 is omitted. Then, at step 108 the pipeline proceeds to the next processing cycle in which pending threads move up one stage within the pipeline, and the method then returns once more to step 100.

It will be appreciated that the steps of the method of FIG. 2 need not be performed in the exact order shown in FIG. 2. For example, steps 102 and 110 of forwarding/looping the thread in the final stage of the pipeline 10 could be performed after the priority control operations of steps 104, 106 and 112-120 respectively. Also, some steps may be performed in parallel with one another.

The priority tag 34 has a given number of bits. The smallest number of bits that provides a number of distinct priority levels sufficient to provide a unique priority level for each pending thread in flight in the pipeline is log2(N) (rounded up to the nearest integer), where N is the maximum number of threads in flight in the pipeline at a time. A greater number of bits for the priority tag could be used, but this would be unnecessary because then there would be more priority levels than the maximum number of threads in the pipeline. On the other hand, a fewer number of bits would not enable a unique priority level to be assigned to each thread in the pipeline, so that an older thread may not be able to be distinguished from a newer thread. Hence, for an entirely fair priority scheme, the number of bits of the priority tag should be the smallest integer greater than or equal to log2(N).

However, if some unfairness in the priority scheme is allowable, so that it is acceptable for a given number of newer threads to have the same priority level as an older thread, then the priority tag width can be reduced to a smaller number of bits, and can even be reduced to a 1-bit priority tag. This can be useful in order to reduce the area overhead required to implement the priority technique. The smaller the number of bits of the priority tag 34, the smaller the width of the comparators, registers, and other components used for priority level tracking, and so the smaller the area overhead. A reduced number of bits in the priority tag means that in some cases X newer threads can overtake an older thread in priority, where the value X is a function of the maximum number of threads which can be in flight in the pipeline at once and the number of bits in the priority tag. Nevertheless, X would be less than the total number of threads in flight at once, and so the number of threads which can achieve the same or higher priority as an older thread is limited.

Figures 3, 4:
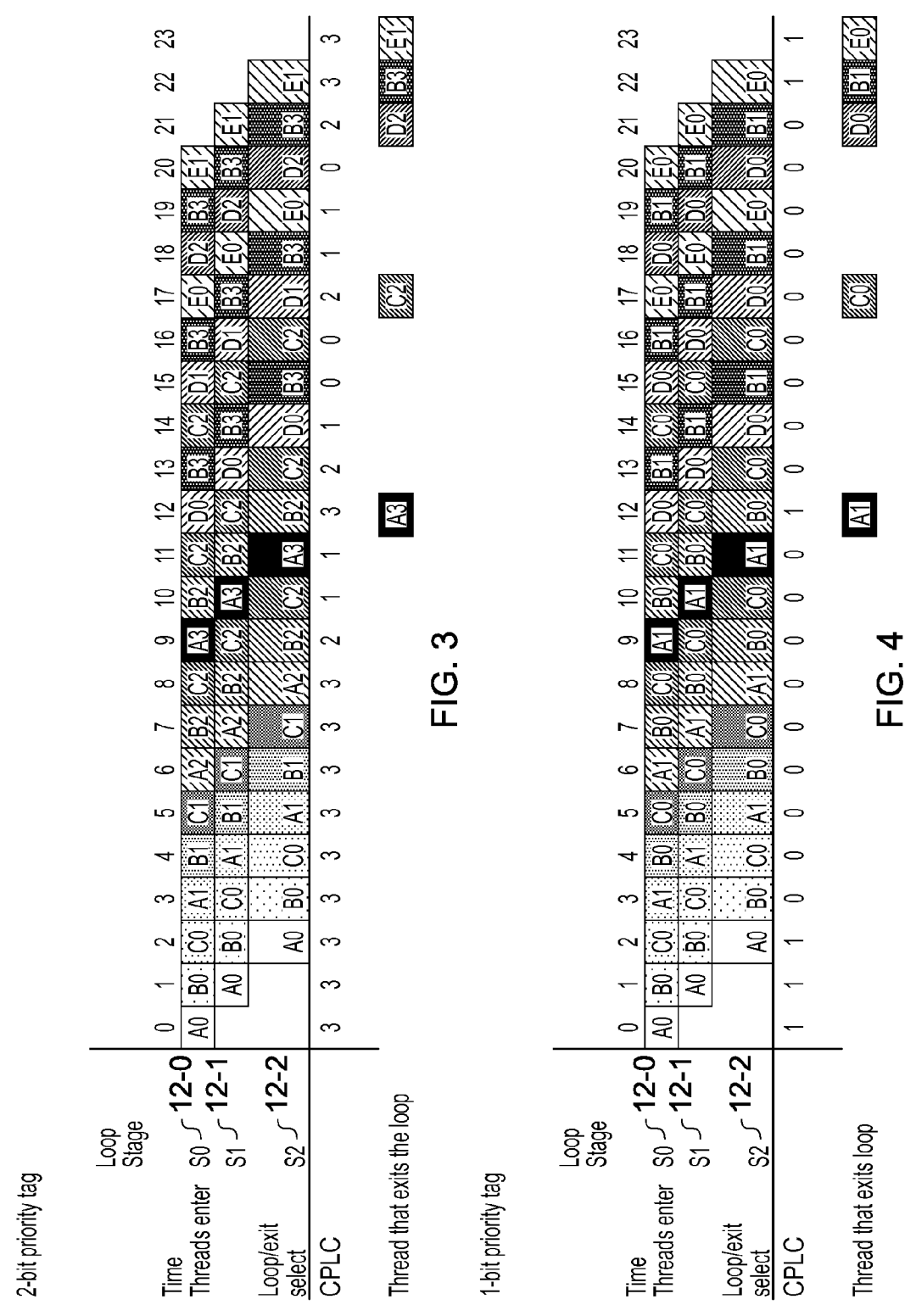

FIGS. 3 and 4 illustrate examples of the way in which the priority of pending threads may be controlled as the threads pass through a 3-stage pipeline 10 of the type shown in FIG. 1.

In FIG. 3, the priority level of the threads is tracked using a 2-bit priority tag. Since the pipeline can handle a maximum of three in flight threads at once, the 2-bit priority tag provides 4 priority levels, which is sufficient to allocate a distinct priority level to each thread in flight (log2(3)=1.58=2 when rounded up to the nearest integer). In FIG. 3, threads A, B, C, D and E are pending. The threads initially enter the pipeline with the lowest priority level 0. In cycles 0 to 2 of FIG. 3, the threads A, B and C enter the pipeline. As the threads progress through the pipeline, requests for resources are issued by the resource-requesting stages 12-0, 12-1.

In cycle 2, thread A reaches the final stage 12-2 of the pipeline, and it is determined that the resources required by thread A are not yet ready. Hence, thread A is looped back to the beginning of the pipeline and re-enters the pipeline at the first stage in cycle 3. Since in cycle 2 the priority level 0 of thread A is less than the priority cap level (CPLC) 3, then the priority level of thread A is incremented and so becomes priority level 1 for cycle 3. Similarly, in cycles 3 to 8, the priority level of the threads A, B, C is incremented each time the thread is looped back, because the resources requested for the threads are not yet available and the priority level of threads A, B and C is still lower than the priority cap level CPLC. In cycles 3 to 11, each time a thread is looped back to the beginning of the pipeline, the arbiter 22 prevents a new thread entering the pipeline and instead selects the looped thread A, B, C in preference to a new pending thread D, E.

At cycle 8, thread A is looped back to the first pipeline stage, and on incrementing the priority level of thread A, thread A reaches the priority cap level of 3. Hence, the priority cap level is now decremented so that in cycle 9 the priority cap CPLC is now at level 2. This means that thread A is the only thread at the highest priority level 3. Threads B and C are prevented from reaching priority level 3 because the priority level of these threads is capped at the new cap level of 2.

In cycle 9, the priority level of thread B is not incremented because the priority level 2 of thread B is not lower than the priority cap level 2. As the re-evaluated priority level after looping thread B back to the beginning of the pipeline is equal to the priority cap 2, then the priority cap is again decremented so that at cycle 10 it becomes equal to 1.

The thread continue to loop through the pipeline until the required resources become available. At cycle 11 it is determined that the resources required by thread A are ready and so in the next cycle 12 thread A can leave the pipeline. At this point, it is determined that the priority level 3 of the exiting thread A is higher than the current value 1 of the priority cap, and so for the following cycle 12 the priority cap is set to the priority level 3 of thread A.

Now the priority level 3 becomes available for use by the other threads once more. In cycle 12, thread B reaches the end of the pipeline and is looped back to the beginning. As the priority level 2 of thread B is less than the priority cap level 3, the priority level of thread B is incremented to priority level 3. However, this means that the thread looped back to the beginning of the pipeline (thread B) has a re-evaluated priority level 3 equal to the priority cap level 3, and so the priority level is decremented once more to a value of 2 to prevent subsequent threads reaching the same priority level as thread B. Hence, the priority cap ensures that only one thread can have the highest priority level, so that the oldest thread remaining in the pipeline can be distinguished from other threads.

Even though the highest priority level 3 is now set to thread B, it is still possible for the resources requested by a newer thread to become available before the higher priority thread. For example, in FIG. 3 the resources required by thread C are available by cycle 16 and so thread C can exit in cycle 17 even though thread C has a lower priority than thread B. Hence, it is possible for the hit under miss scenario to arise where a newer thread whose resources are available overtakes an older thread that is still waiting for resources. Similarly, at cycle 20 the thread D is ready to exit the loop before thread B.

FIG. 3 shows that while it may take a reasonable number of cycles for the resources for one thread to become available, following threads may typically remain pending for fewer cycles than the first thread, since it is reasonably common for multiple threads to use the same resources. For example, after the data required by one thread has been placed in the cache 6, 8, then that data may be used by subsequent threads as well and so these threads may not need to wait so long for resources to become available. This can be seen in FIG. 3, where threads D and E are processed more rapidly than threads A, B and C.

The example with a 2-bit priority tag shown in FIG. 3 ensures that, aside from an initial setup period, the priority level of each thread in the pipeline can be distinguished from one another with an older thread having a higher priority then any newer thread. See FIG. 3, where from cycle 13 onwards, the threads always have unique priority levels in the correct sequence corresponding to the order in which the threads entered the pipeline.

FIG. 4 shows another example in which a 1-bit priority tag is used. Hence, in the example of FIG. 4, the oldest thread in the pipeline can be identified by a priority level of 1, and all other threads have the same priority level 0. This means that it is possible for a newer thread to be granted access to a resource in preference to an older thread. Nevertheless, this unfairness may be tolerated, for example if reducing the area cost of implementing the priority scheme is more important than the fairness of resource allocation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   processing circuitry configured to process processing threads using resources accessible to said processing circuitry;
   a pipeline for handling at least two pending threads awaiting processing by said processing circuitry, said pipeline comprising at least one pipeline stage including at least one resource-requesting pipeline stage for requesting access to said resources for said pending threads;
   a pipeline controller configured to determine whether requested resources are available for a pending thread in a final pipeline stage of said pipeline, to return said pending thread to a first pipeline stage of said pipeline if said requested resources are not yet available for said pending thread, and to forward said pending thread from said pipeline if said requested resources are available for said pending thread;
   a priority controller for controlling priority levels of said pending threads, said priority levels defining a priority with which respective pending threads are granted access to resources, pending threads being assigned a base priority level when entering said pipeline for the first time;
   wherein said priority controller is configured to selectively raise the current priority level of a pending thread in said final pipeline stage if said pipeline controller returns said pending thread to said first pipeline stage.

2. The data processing apparatus according to claim 1, wherein said pipeline comprises a plurality of pipeline stages including said at least one resource-requesting pipeline stage.

3. The data processing apparatus according to claim 1, wherein said final pipeline stage of said pipeline comprises at least one of said pipeline controller and said priority controller.

4. The data processing apparatus according to claim 1, comprising an arbiter configured to select pending threads for input to said first pipeline stage;
   wherein said arbiter is configured to select pending threads that are returned from said final pipeline stage by said pipeline controller in preference to new pending threads that have not yet entered the pipeline.

5. The data processing apparatus according to claim 1, wherein said priority controller is configured to re-evaluate said current priority level of said pending thread in said final pipeline stage if said pipeline controller returns said pending thread to said first pipeline stage such that said pending thread has a re-evaluated priority level when returned to said first pipeline stage;
   said re-evaluated priority level is higher than said current priority level if said current priority level is lower than a priority cap level; and
   said re-evaluated priority level is equal to said current priority level if said current priority level is equal to or higher than said priority cap level.

6. The data processing apparatus according to claim 5, wherein said priority controller is configured to lower said priority cap level if said re-evaluated priority level equals said priority cap level.

7. The data processing apparatus according to claim 6, wherein said priority controller is configured to set said priority cap level to said current priority level of said pending thread in said final pipeline stage if said pipeline controller forwards said pending thread from said pipeline and said current priority level of said pending thread is greater than said priority cap level.

8. The data processing apparatus according to claim 1, wherein said priority levels are represented by a set of discrete values including a base value representing said base priority level and at least one further value representing at least one higher priority level.

9. The data processing apparatus according to claim 8, wherein said pipeline is configured to handle a maximum of N pending threads, and said set of discrete values comprises M-bit values, where N is an integer and M is the smallest integer greater than or equal to $Log2(N)$.

10. The data processing apparatus according to claim 8, wherein said pipeline is configured to handle a maximum of N pending threads, and said set of discrete values comprises M-bit values, where M and N are integers and $M<log2(N)$.

11. The data processing apparatus according to claim 1, wherein said pipeline comprises a plurality of resource-requesting pipeline stages for requesting access to associated resources for said pending threads, and said pipeline controller is configured to return said pending thread in said final pipeline stage to said first pipeline stage if any of the associated resources associated with said plurality of resource-requesting pipeline stages is not yet available.

12. The data processing apparatus according to claim 1, wherein said processing circuit comprises a graphics processor.

13. The data processing apparatus according to claim 12, wherein said processing threads comprise texture mapping threads for controlling said graphics processor to perform texture mapping operations.

14. The data processing apparatus according to claim 1, wherein said resources include at least one of:
    data or instructions from a storage unit;
    an allocation of space within a storage unit;
    bandwidth on a network, interconnect or bus; and
    use of a processing unit.

15. The data processing apparatus according to claim 1, wherein said resources include data or instructions from a cache memory, and at least one of said resource-requesting pipeline stages comprises a cache requesting stage configured to issue to said cache memory cache access requests for data or instructions for a pending thread in said cache requesting stage.

16. The data processing apparatus according to claim 15, wherein said cache requesting stage is configured to:
determine, if a cache access request for a pending thread in said cache requesting stage results in a cache miss, whether said cache memory includes an available storage location, and if said cache memory includes an available storage location to allocate said available cache storage location to said pending thread and trigger a memory access request for data or instructions requested by said cache access request.

17. The data processing apparatus according to claim 16, wherein said cache requesting stage is configured to:
determine, if said cache memory does not include an available storage location, whether an unavailable cache storage location of said cache memory is allocated to another pending thread having a lower priority than said pending thread in said cache requesting stage, and
if said unavailable cache storage location is allocated to another pending thread having a lower priority than said pending thread in said cache requesting stage, to re-allocate said unavailable cache storage location to said current pending thread and trigger a memory access request for said data or instructions requested by said cache access request.

18. The data processing apparatus according to claim 17, comprising circuitry configured to control said cache memory, when a pending thread for which said cache requesting stage has allocated a cache storage location is forwarded from said pipeline, to prevent re-allocation of the cache storage location allocated to said pending thread until processing of said pending thread is complete.

19. A data processing apparatus comprising:
means for processing threads using resources accessible to said means for processing;
means for handling at least two pending threads awaiting processing by said means for processing, said means for handling comprising at least one means for requesting access to said resources for said pending threads;
means for determining whether requested resources are available for a pending thread in a final stage of said means for handling, for returning said pending thread to a first stage of said means for handling if said requested resources are not yet available for said pending thread, and for forwarding said pending thread from said means for handling if said requested resources are available for said pending thread;
means for controlling priority levels of said pending threads, said priority levels defining a priority with which respective pending threads are granted access to resources, pending threads being assigned a base priority level when entering said means for handling for the first time;
wherein said means for controlling is configured to selectively raise the current priority level of a pending thread in said final stage if said means for controlling returns said pending thread to said first stage means.

20. A data processing method comprising:
processing threads with processing circuitry using resources accessible to said processing circuitry;
handling at least two pending threads awaiting processing by said processing circuitry in a pipeline comprising at least one pipeline stage including at least one resource-requesting pipeline stage for requesting access to resources for said pending threads, wherein said pending threads are associated with priority levels defining a priority with which respective pending threads are granted access to resources, and pending threads are assigned a base priority level when entering said pipeline for the first time;
determining, by a pipeline controller, whether requested resources are available for a pending thread in a final pipeline stage of said pipeline;
if said requested resources are not yet available for said pending thread in said final pipeline stage, the pipeline controller returning said pending thread to a first pipeline stage of said pipeline and selectively raising the current priority level of said pending thread; and
if said requested resources are available for said pending thread in said final pipeline stage, the pipeline controller forwarding said pending thread from said pipeline.

21. The method according to claim 20, comprising re-evaluating said current priority level of said pending thread in said final pipeline stage if said requested resources are not yet available, such that said pending thread has a re-evaluated priority level when returned to said first pipeline stage;
said re-evaluated priority level is higher than said current priority level if said current priority level is lower than a priority cap level; and
said re-evaluated priority level is equal to said current priority level if said current priority level is equal to or higher than said priority cap level.

22. The method according to claim 21, comprising lowering said priority cap level if said re-evaluated priority level equals said priority cap level.

23. The method according to claim 22, comprising setting said priority cap level to said current priority level of said pending thread forwarded from said pipeline if said current priority level of said pending thread is greater than said priority cap level.

* * * * *